Feb. 2, 1960

H. RUDOLPH 2,923,064

MEASURING INSTRUMENT

Filed Feb. 19, 1957

INVENTOR.
Hans Rudolph
BY
Paul E. Mullendore
ATTORNEY.

Feb. 2, 1960 H. RUDOLPH 2,923,064
MEASURING INSTRUMENT
Filed Feb. 19, 1957 3 Sheets-Sheet 2

INVENTOR.
Hans Rudolph
BY
Paul E. Mullendore
ATTORNEY

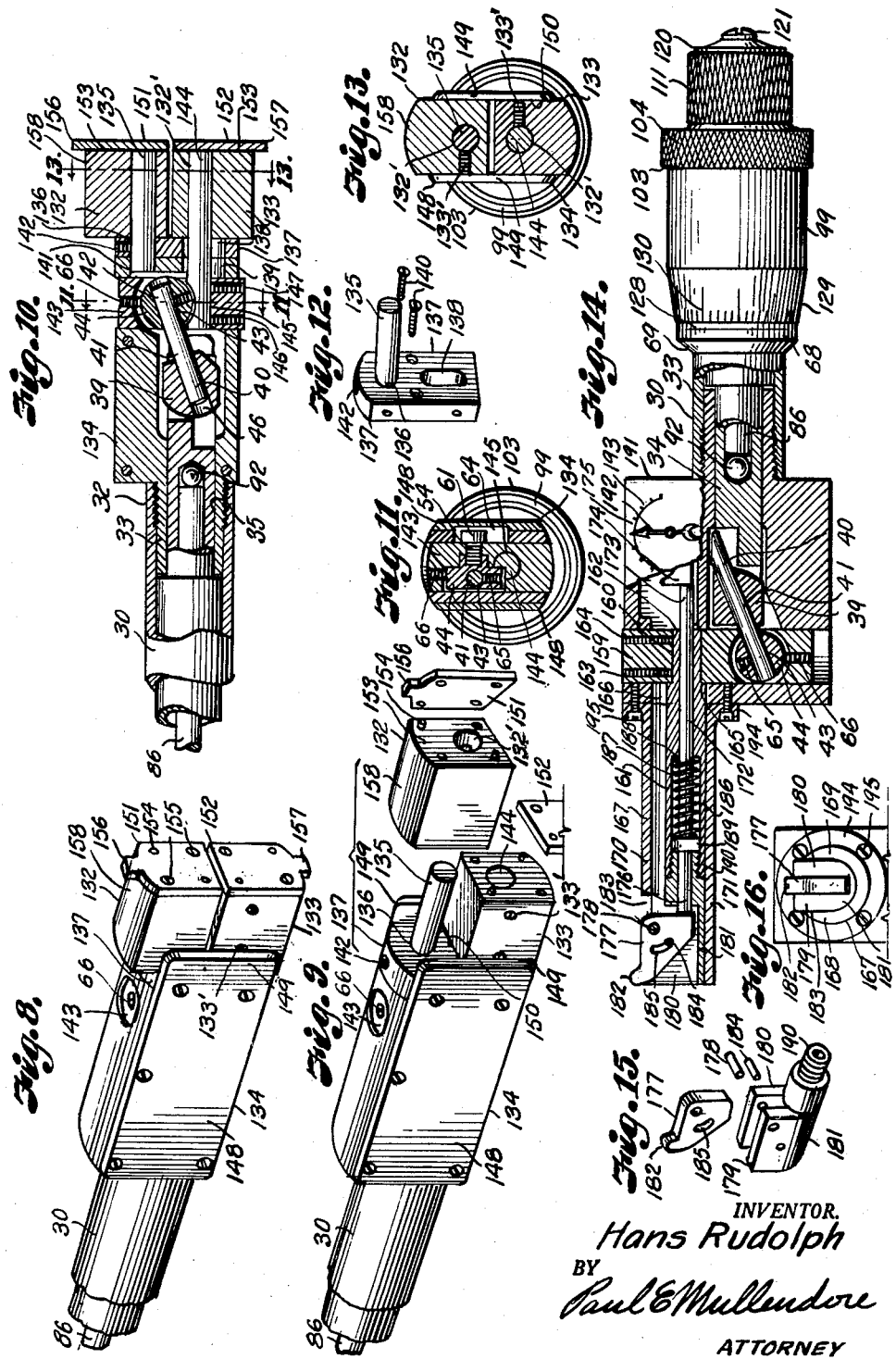

United States Patent Office 2,923,064
Patented Feb. 2, 1960

2,923,064

MEASURING INSTRUMENT

Hans Rudolph, Mission, Kans.

Application February 19, 1957, Serial No. 641,118

16 Claims. (Cl. 33—164)

This invention relates to precision instruments for determining internal dimensions of bore holes, cylindrical sleeves, and the like. Heretofore, the production of such instruments required the utmost care and skill, but it has been impossible to precalibrate such instruments because even minute variations in the shape and fitting of the parts thereof render the calibrations inoperative for precision work, consequently, in precision instruments it became the practice to calibrate each individual instrument after assembly. Thus, precision instruments have been expensive and require careful handling to avoid getting the parts out of relationship with respect to the calibrations. When this happens, the instrument is of no further value for obtaining precision measurements.

Therefore, a principal object of the present invention is to provide a precision instrument having simple and effective means incorporated therein for making adjustment in movement of the working parts in accordance with a standard calibration, and to maintain accuracy of the instrument throughout the life thereof.

Another object of the present invention is to provide a precision instrument having parts which are adapted to be formed by simple machine operations and which are characterized in their ease of assembly and responsive movement thereof in an assembled instrument.

It is also an object of the invention to provide a precision instrument having rugged construction, yet capable of extreme accuracy.

Further objects of the invention are to provide a precision instrument with interchangeable gauge blocks, to increase the range of measurements that can be attained with a single instrument; and to provide the gauge blocks with attachments to conform with different inner shapes, such as internal grooves in a bore hole, internal threads, and the like.

Another object is to provide a precision instrument that measures directly the distance between opposite diametrical points within a cylindrical bore and whereby measurements may be taken in different diametrical directions in the same transverse plane to determine the transverse contour of a bore hole.

A further object of the invention is to provide a precision instrument wherein the moving parts are cylindrical and rotate or move coaxially with respect to each other, to promote accuracy without complicated machining procedures, such as required in producing wedges and similar critical surfaces ordinarily used in precision instruments.

In accomplishing these and other objects of the invention, I have provided improved structure, the preferred forms of which are illustrated in the accompanying drawings, wherein:

Fig. 5 is a perspective view of the measuring head of the instrument, with one cover plate and the interchangeable gauge block removed to better illustrate the internal mechanism and the removable mounting of the stationary gauge block.

Fig. 6 is a cross section on the line 6—6 of Fig. 2 and turned 90° relatively to Fig. 2.

Fig. 7 is a perspective view of the measuring head and parts contained therein, with the parts being shown in spaced relation.

Fig. 8 is a perspective view of the measuring head of a modified form of the invention.

Fig. 9 is a similar view with the interchangeable stationary gauge block removed and also an adapter therefor, the parts removed being shown in spaced apart relation.

Fig. 10 is a longtudinal section through the measuring head shown in Figs. 8 and 9.

Fig. 11 is a cross section on the line 11—11 of Fig. 10.

Fig. 12 is a perspective view of the bracket for supporting the interchangeable stationary gauge block.

Fig. 13 is a section on the line 13—13 of Fig. 10.

Fig. 14 is a side elevational view partly in section of a further modified form of the invention.

Fig. 15 is a perspective view of the parts of the gauge element and support therefor of the form of the invention illustrated in Fig. 14.

Fig. 16 is a partial end view of the form of the invention shown in Fig. 14.

Figure 1:
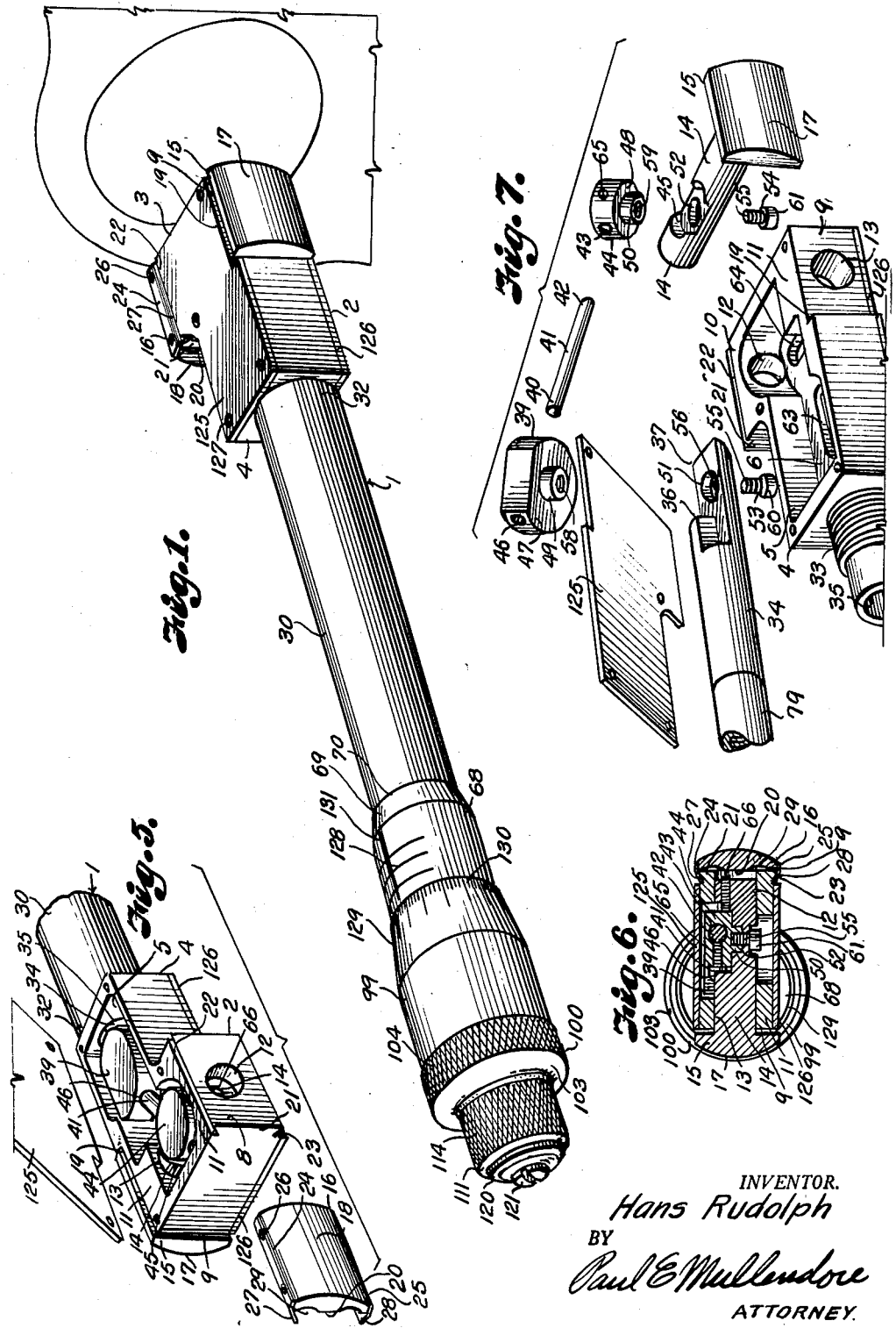
Fig. 1 is a perspective view of an instrument for determining inside diameters and which embodies the features of the present invention.

Referring more in detail to the drawings, and first to the form of the invention illustrated in Figs. 1 to 7, inclusive:

1 designates a precision measuring device embodying the features of the present invention and commonly known as an inside micrometer for determining inside dimensions such as the diameter of a bore hole. The instrument includes a measuring head 2 of generally L-shape to provide a transverse portion 3 and a shank portion 4, both portions being shown of generally rectangular cross section. The shank portion 4 has an elongated recess 5 opening through one face side and closed at the other by a wall 6. The recess extends into the transverse portion and has an offset portion 7. The offset portion 7 of the recess is inset from the ends 8 and 9 of the transverse part 3 to leave relatively thick end walls 10 and 11, and extending therethrough are axially registering bores 12 and 13 to accommodate a cylindrical stem 14 of a movable gauge block 15. The stem 14 has its ends slidably supported in the bores 12 and 13 for reciprocatory movement in separating the movable gauge block 15 with respect to a stationary gauge block 16. The stationary gauge block 16 is removable from the offset end 8 of the transverse portion 3 for exchange with other gauge blocks having a different thickness and/or contour to adapt the measuring head for measuring bore holes of different diameters, as later to be described.

The gauge blocks 15 and 16, shown in Figs. 1 to 7, are generally rectangular and have cylindrical outer faces 17 and 18. The cylindrical faces 17 and 18 are formed on radii of less length than the radius of the minimum size bore hole with which a stationary gauge block 16 is used. The cylindrical faces 17 and 18 extend longitudinally with the shank portion 4 of the head 2 to provide line contact of the faces 17 and 18 with opposite sides of a bore hole to enable contact thereof at any opposite diametrical points of the bore hole. The movable gauge block 15 when retracted is partially contained within a recess 19 in that side of the head 2.

The stationary gauge block 16, while substantially conforming in shape to the movable gauge block 15, has the inner face 20 thereof supported in contact with the end 8 of the head 2 by a dovetail 21. The dovetail is formed by V-shaped grooves 22 and 23 in the upper and lower faces of the offset portion of the head. Cooperating with the dovetail 21 are plates 24 and 25 attached to opposite side edges of the gauge block by screws 26 and which have inwardly converging flanges 27 and 28 to cooperate with the inner face 20 of the gauge block in providing a dovetailed groove 29, as best shown in Fig. 5. It is to be understood that a plurality of gauge blocks 16 will be furnished with each instrument, each gauge block being of identical construction with the exception that the blocks will be of different thickness between the inner faces 20 and the outer faces 18 thereof, whereby any one of the gauge blocks may be attached to the head 2 by sliding it upon the dovetail 21. This enables the instrument to have a relatively wide range of measurements all within the relatively small reciprocatory movement of the movable gauge block 15, as now to be described.

Figure 2:
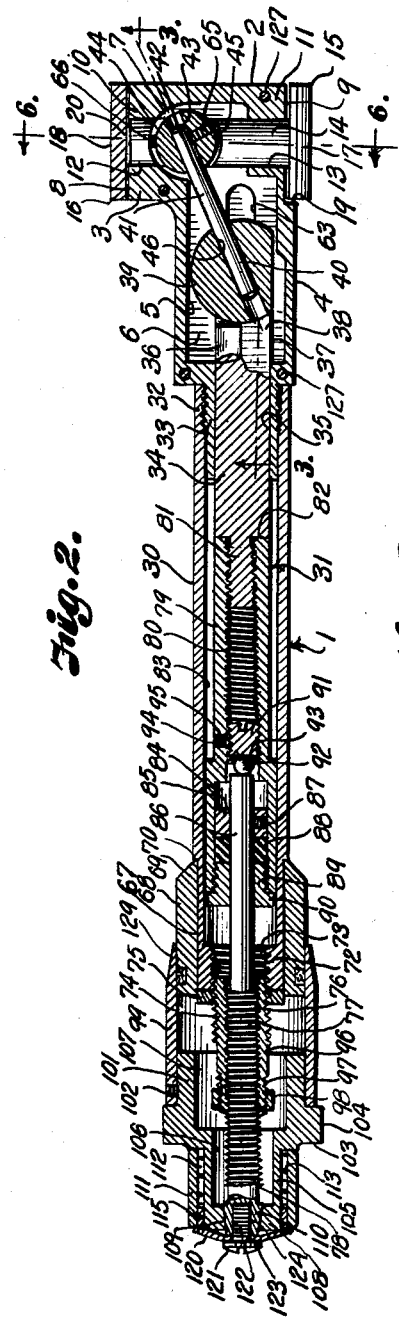
Fig. 2 is a longitudinal section of the measuring instrument.
Figure 3:
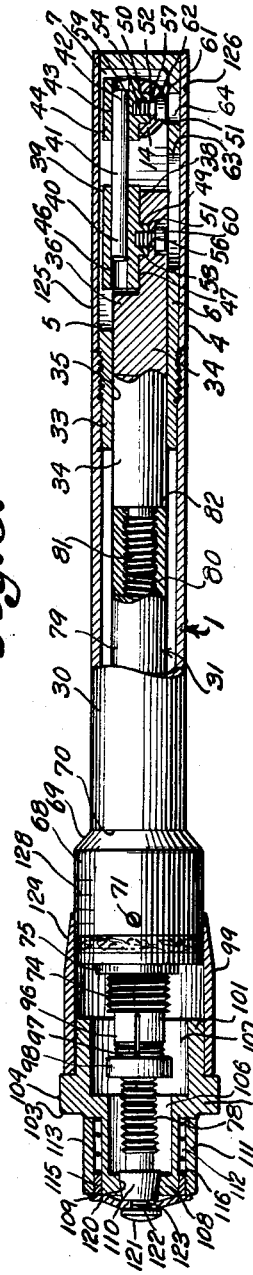
Fig. 3 is a side elevational view of the measuring instrument, with the end portions thereof being shown in section, the section at the measuring head end being taken on the line 3—3 of Fig. 2.

The instrument also includes a tubular shank 30 forming an extension of the shank portion 4 of the head 2 to house a reciprocatory stem assembly 31. The tubular shank 30 has an internally threaded end 32 that connects with an externally threaded tubular neck 33 of the shank 4, as best shown in Figs. 2 and 3. The reciprocatory stem assembly 31 has a plunger 34 slidably mounted within the bore 35 of the tubular neck 33 to project one end 36 into the recess 5. The end 36 of the plunger has an extension 37 of substantially semicircular cross section to provide a flat face 38 on a diameter thereof to seat a pin guide member 39 thereon to guidingly support one end 40 of a biasly arranged pin 41, the other end 42 of which is secured within a transverse bore 43 of a supporting member 44. The members 39 and 44 may be of any suitable shape, but for the sake of compactness and simplicity of construction, the members illustrated are generally circular in that they are adapted to be adjustably movable upon the flat face 38 of the extension 37 and in a recessed portion 45 of the shank 14. The bore 43 in the member 44 and the bore 46 of the member 39 extend diametrically completely through the respective members 44 and 39. In order to properly position the members 39 and 44, they have side faces 47 and 48 thereof (Fig. 7) that are provided with axial bosses 49 and 50 that fit within correspondingly shaped recesses 51 and 52 extending inwardly from the flat face 38 of the extension 37 and the bottom of the recess 45, respectively. The members are clamped in position to maintain annular alignment of the bores 46 and 43 by means of fastening devices, such as screws 53 and 54, the shanks 55 of the screws extending through openings 56 and 57 and into threaded sockets 58 and 59 of the bosses, the heads 60 and 61 of the screws being countersunk within recesses 62. Access is provided to the screw heads 60 and 61 through elongated openings 63 and 64 that extend longitudinally of the direction of movement of the plunger 34 and the shank 14 (see Figs. 3, 4 and 6). The end 42 of the pin 41 is fixed within the bore 43 of the member 44 by a set screw 65, while the member 41 is further fixed by a similar set screw 66 that is threaded into an opening in the end of the stem 14 to bear against the periphery of the member 44. The other end 40 of the pin is freely slidable within the bore 46 of the member 39.

It is obvious, with the construction thus far described, that reciprocation of the rod 34 carries the member 39 therewith to move toward and away from the shank 14 as the pin 41 slides within the bore 46 to effect a reciprocatory movement of the shank 14 of the movable gauge block 15. An important feature of this arrangement is that a very simple and satisfactory operating connection is provided between the reciprocatory stem assembly 31 and the reciprocatory shank 14 of the movable gauge block, in that a cylindrical part moves within a cylindrical bore of another part. Consequently, only simple machining and drilling operations are required in forming the respective parts. Another feature is that the ratio of reciprocatory movement between the stem 14 and assembly 31 may be adjusted merely by changing the angle of the pin 41 with respect to the axes of the plunger 34 and the stem 14. For example, by loosening the screws 53 and 54 and set screw 66, the members 39 and 44 may be shifted in either arcuate direction to change the angle of the pin 41. When the member 39 is turned so that the bore 46 more nearly approaches the axis of the assembly 31, the movable gauge block 15 will have less reciprocatory movement with the same reciprocatory movement of the assembly 31. It is to be understood, however, that this adjustment will project the movable gauge block 15 slightly further from its fully retracted position, but the ratio of the reciprocatory movements is changed. Likewise, the reciprocatory movement is changed when the angle of the pin 41 is increased, but in this instance the relative reciprocatory movement of the shank of the movable gauge block is increased relatively to the movement of the stem assembly 31. This constitutes an important part of the present invention, because it permits adjustment of the parts in accordance with a standard calibration of the operating head of the instrument, now to be described.

The tubular shank 30 may be of any desired length, depending upon the depth of the bores to be measured. The tubular shank 30 has a reduced outer end 67 for mounting a calibrated collar 68 thereon having a larger outer diameter than the outer diameter of the shank 30 to join therewith by a bevel 69. The beveled end of the collar 68 is seated against a shoulder 70 formed by the reduced end 67. The collar 68 is retained in fixed position on the end 67 by one or more set screws 71. The reduced end 67 of the shank 30 has an internal flange 72 which is provided with internal threads 73 to adjustably mount an exteriorly threaded bushing 74 therein, the adjustment being maintained by a jam nut 75 that is threaded on the bushing, to be tightened against the end of the shank 30 so that after adjustment of the bushing 74, the adjustment is maintained. The bushing 74 is provided with an interior thread 76 to connect with exterior threads 77 on a rotatable shaft 78. The shaft 78 is adapted to be turned within the bushing to cause reciprocatory movement of the stem assembly 31. The stem assembly 31 also includes a tubular extension 79 having an internally threaded axial bore 80 for connection with a reduced exteriorly threaded neck 81 of the plunger 34, the neck 81 forming a shoulder 82 against which the stem extension 79 abuts when it is tightened onto the exterior threads of the neck 81 on the plunger 34.

The opposite end of the stem extension 79 is enlarged to provide a sliding fit thereof within the bore 83 of the shank 30 and formed therein is an axial counterbore 84 to accommodate therein a collar 85 that is fixed onto an unthreaded rod portion 86 of the shaft 78, the collar being attached thereto by means of a set screw 87. Also contained within the counterbore on the outer side of the collar 85 is a thrust ring 88 that is retained within the counterbore by means of a plug 89 threaded into the outer end of the counterbore 84, as shown in Fig. 2. The plug 89 is tightened in the counterbore by a flange 90 thereon engaging the outer end of the tubular extension 79, as will be understood from inspection of Fig. 2.

Contained in inset relation from the inner terminal of the counterbore 84 is a seat member 91 for an antifriction thrust bearing, preferably a ball 92, the ball 92 being retained within a pocket 93 in the end of the seat member 91. The seat member 91 has external threads so that it may be threaded into the threaded bore 80 and retained in position therein by means of a set screw 94 which is turned within an opening 95 in the tubular extension 79. The cylindrical or rod portion 86 of the shaft 78 bears directly on the ball 92 and retains it within the seat member 91. The threaded portion 77 of the shaft 78 extends through a collet 96 on the bushing 74 and the outer portion of the collet is exteriorly threaded as at 97 for a nut 98 by which the collet may be tightened about the threaded portion 77 of the shaft 78 to adjust the gauge fit of the threads.

Slidably mounted on the collar 68 is a barrel 99, the outer end of which is closed by a cap 100. The cap 100 includes a reduced portion 101 that fits within the outer end of the barrel 99 and is retained therein by one or more set screws 102 threaded into openings in the barrel and having ends engaging the reduced portion 101 of the cap, as shown in Fig. 2. The cap has an outwardly extending annular flange 103 preferably of slightly larger outer diameter than the outer diameter of the barrel 99 to accommodate knurling 104 on the outer periphery thereof by which the barrel 99 may be rotated, as later described. The cap 100 has an outer cylindrical spindle 105 that is provided with an internal cylindrical recess 106 that joins with a corresponding larger recess 107 in the inner end of the cap 100 to form a housing for the bushing 74, collet 96, and the threaded end 77 of the shaft 78. The recess is closed by a wall 108 having a tapered axial bore 109 therein which flares inwardly toward the recess 106 to firmly seat therein a correspondingly tapered end 110 on the outer end of the shaft 78.

Figure 4:
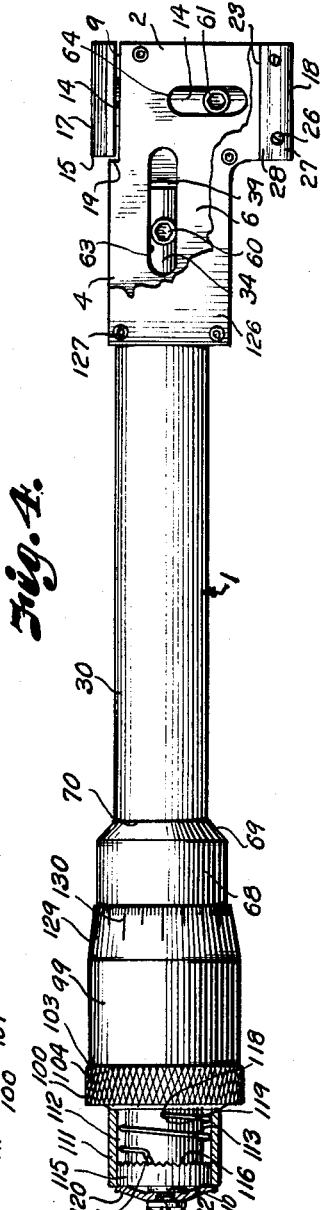
Fig. 4 is a plan view of the instrument, parts being broken away and other parts shown in section, to better illustrate the construction.

Rotatably mounted on the spindle 105 is a sleeve 111 having a larger inner diameter than the outer diameter of the spindle, in forming an annular space 112 therebetween to contain a coil spring 113. The coil spring 113 is of light action and is for the purpose of connecting the sleeve 111 in driving relation with the cap 100 and whereby the cap 100 may be turned through the spring 113 to rotate the shaft 78 and effect reciprocatory movement thereof within the internally threaded bore of the bushing 74 to cause the end 86 to bear upon the ball 92 to effect movement of the movable gauge block, whereby a more sensitive contact may be effected between the gauge blocks and the surfaces of a bore hole to be measured than can be obtained by movement of the gauge block through direct rotation of the cap 100 by means of the knurled portion 104 thereof. To facilitate turning of the sleeve, the periphery thereof is provided with knurling 114. In order to connect the spring 113 with the sleeve 111, the sleeve 111 is provided with an inset ring 115 that is suitably connected therewith and which has the inner side edge thereof provided with a circumferential series of teeth 116 adapted to be engaged by a pawl 117 formed by the outer end of the spring 113, as shown in Fig. 4. The inner end of the spring 113 has a terminal 118 bent inwardly to engage in an opening 119 provided in the spindle 105 of the cap 100, also shown in Fig. 4. The sleeve 111 is retained in position by means of a washer 120 of sufficient diameter to engage the outer end of the sleeve 111. The washer is retained in position and the tapered end 110 of the shaft is drawn tightly into the tapered bore 109 by a screw 121, the threaded shank 122 of which extends through an opening 123 in the washer 120 and into a threaded socket 124 of the shaft 78.

The wall 6 of the measuring head 2 is covered by a plate 125 and the recesses 5 and 7 are closed by a plate 126. The plates 125 and 126 conform to the shape of the head 2 and are attached to the marginal portions thereof by screws 127.

The collar 68 is provided on the one side of the exterior thereof with circumferential calibrations or lines 128, as shown in Figs. 1 and 3. The barrel is beveled as at 129 and the bevel has calibrations 130 to provide a vernier scale readable relatively to a longitudinal mark 131.

The form of the invention illustrated in Figs. 8 to 13, inclusive, is similar to the form just described, with the exception of the mounting of the gauge blocks. In this form of the invention, the gauge blocks 132 and 133 extend from the end of the measuring head 134. The fixed gauge block 132 is mounted on a pin 135 having support in an opening 136 of a plate 137. The plate 137 conforms in shape to the end of the measuring head 134 and has an elongated slot 138 registering with a similar slot 139 in the end of the measuring head. The plate 137 carrying the pin 135 is attached to the end of the measuring head 134 by fastening devices 140. The pin 135 also preferably projects into a hole 141 that is provided in the end of the measuring head. The pin 135 is anchored in the opening of the plate by a set screw 142.

The measuring head has a transverse member 143 which is similar to the stem 14, previously described. The movable gauge block 133, instead of being connected with the end of the member 143, is mounted on a pin 144 having one end extending through a transverse opening 145 in the member 143 and through the elongated slots 139 and 138, as best shown in Fig. 10. The pin 144 is anchored in the opening 145 by means of set screws 146 and 147, as best shown in Fig. 10. The pin 144 thus extends parallel with the pin 135 and shifts laterally therefrom upon reciprocation of the transverse member 143 while maintaining parallel relationship therewith. The gauge blocks 132 and 133 have longitudinal bores 132' that extend longitudinally therethrough to permit mounting them on the pins. The gauge blocks also carry set screws 133' by which they are retained on the pins. The member 143 is actuated in exactly the same manner and with like mechanisms as the stem 14, previously described, therefore, the same description applies and the parts of the operating mechanism are identified by the same numerals.

The cover plates 148 for the modified form of invention project beyond the plate 137 to provide wings 149 for engaging sides of the gauge block 132 therebetween to prevent an incorrect placement on the pin 135. The wings 149 also provide a guideway 150 for the movable block 133. In this form of the invention, the gauge blocks 132 and 133 are shown with attachments 151 and 152, respectively, that are removably attached to the outer end faces 153 of the gauge blocks by pins 154 and screws 155. The attachments have laterally extending lugs 156 and 157 which project from the arcuate faces 158 of the gauge blocks to adapt the instrument for measuring internal annular grooves that may exist within a bore hole or the like. It is obvious that the lugs 156 and 157 may be of various shapes, depending upon the particular work to be measured. It is obvious that the location of the gauge blocks results in a more compact measuring head.

The instrument illustrated in Figs. 14 to 16, inclusive, has the same mechanism for operating the transverse member 159, and the same numbers apply thereto. The member 159 has a transverse bore 160 for mounting a tubular arm 161. The arm 161 has a reduced end 162 that is fixed within the transverse bore 160 by set screws 163 and 164. The reduced end 162 provides a shoulder 165 adapted to abut firmly against the side of the transverse member 159. The arm 161 moves with the member 159 through a slot 166 in the measuring head. The arm 161 is movable in an outer tubular arm 167 which constitutes the fixed gauge element. The outer arm 167 has side wall portions 168 and 169 spaced apart to accommodate the inner arm 161 therebetween and which are connected by transversely arcuate wall portions 170 and 171 so that the internal cross section of the outer arm substantially conforms to the length of the slot 166 to provide for ample movement of the inner arm therein with movement of the transverse member 159. Slidable coaxially within the inner arm 161 is a rod 172 having one end 173 contacting an actuating lever 174 of an indicator 175. The opposite end 176 of the rod 172 makes contact with a feeler 177 having pivotal support on a transverse pin 178 that is carried between ears 179 and 180 of a head 181 on the arm 161. The head 181 supports the feeler 177 with a projection 182 thereon in an opening 183 in the outer arm 167, as best shown in Figs. 14 and 16. The outward movement of the feeler is restricted by a pin 184 that is carried between the ears 179 and 180 and which extends through an arcuate slot 185 in the feeler 177. The rod 172 is kept in contact with the feeler 177 by a coil spring 186 that is sleeved over the rod 172 and is contained within a counterbore 187 of the arm 161. One end of the spring 186 seats against a shoulder 188 at the bottom of the counterbore, and the other end bears against a collar 189 fixed to the rod 172 and which abuts against a threaded neck 190 that forms a part of the head 181. The neck 190 is threaded into the end of the arm 161 to close the end thereof and to seat the collar 189, as best shown in Fig. 14. The indicator 175 is carried by a lateral extension 191 of the measuring head and includes a pointer 192 operable over a scale 193 responsive to longitudinal movement of the rod 173 when the feeler 177 is rocked inwardly under pressure applied to the terminal 182. The outer arm 167 has a base flange 194 that is fixed to the measuring head by screws 195, as shown in Figs. 14 and 16.

Assuming that the measuring devices constructed as described are assembled, the positions of the movable gauge elements or blocks relatively to the fixed gauge elements or blocks are tested in accordance with the calibrations on the collars 68 and the barrels 99 of the micrometer mechanisms of the instruments.

If a readjustment is required to obtain accuracy, for example, in the instrument illustrated in Figs. 1 to 7, inclusive, the cover plate 126 is removed and the screws 54 and 53 are loosened. This allows the member 39 to turn relatively to the plunger 34, and the member 44 to turn on the stem 14, after the set screw 66 has been loosened. The angle or bias position of the pin 41 can then be adjusted relatively to the longitudinal axis of the plunger to properly position the movable gauge block relatively to the fixed gauge block in conformance with the calibrations. After the adjustment has been made, the screws 53 and 54 and set screw 66 are retightened and the plate 126 is replaced.

In measuring, for example, the inside diameter of a bore hole, as shown in Fig. 1, a gauge block 16 is applied to the dovetail 21 of a size to adapt the instrument to the bore hole to be measured. This gives a base measure to which a reading from the micrometer calibrations is to be added. With the measuring head inserted in the bore hole, the cap 100 is rotated to effect movement of the movable gauge block into contact with the wall of the bore hole while the fixed block is in contact with the opposite side wall of the bore hole. Turning of the cap 100 rotates the threaded shaft 78 within the bushing 74 to cause the end 86 of the shaft to exert pressure on the ball 92 for moving the plunger in the direction of the stem 14, with the plunger 34 sliding through the bore 35 in the neck 33 of the shank 4. Movement of the plunger carries the member 39 therewith so that the pin 41 slides in the bore 46 and causes the stem 14 of the gauge block 17 to move outwardly. This manipulation is easily effected because the end of the shaft 86 turns on the ball 92 while the ball rolls in the pocket 93 of the seat 91. A final adjustment is then attained to better feel contact of the gauge blocks with the work by turning the sleeve 111 with the pawl 117 of the spring 113 acting to effect rotation of the cap through the connection of the spring with the spindle 105. When the adjustment is obtained, the diameter of the bore hole may be determined by noting the relative positions of the micrometer scales. This reading is added to the base reading indicated on the fixed gauge block, to give an accurate reading of the diameter of the bore hole under measurement.

After the reading has been obtained, the movable gauge block 15 is retracted. This is effected by turning the cap 100 in the opposite direction so that the shaft 78 rotates in the bushing 74 to exert a thrust of the collar 85 in the direction of the washer 88 to exert a pull of the plunger 34 toward the left (Fig. 2) to carry the member 39 therewith. The member 39 slides relatively to the pin 41, but since the pin is on an angle and the member 39 cannot turn, a wedging action is applied to the pin 41 to shift it toward the fixed gauge block 16. Likewise, since the pin 41 is fixed to the member 44, the pin effects an axial movement of the stem 14 in the direction of the fixed gauge block to retract the movable block 15 toward the fixed gauge block 16, thereby reducing the distance between the faces 17 and 18 of the gauge blocks. The head of the instrument may then be readily removed from the bore hole which has been measured. If a smaller bore hole is to be measured which is not in the range of the instrument as set up with the gauge block 16, that gauge block is removed from the dovetail and replaced with a gauge block having less thickness. In this way, the instrument as illustrated in Figs. 1 to 7 is adapted to a relatively wide range of measurements.

The form of invention illustrated in Figs. 8 to 13, inclusive, operates in substantially the same manner as the instrument just described. Any compensating adjustment that is required is effected in a like manner so that the movement of the various mechanisms correspond with the micrometer calibrations. In measuring a bore hole without the use of the attachments 151 and 152, a gauge block of required dimension is applied to the pin 135 so that it seats snugly against the plate 137, after which it is retained by tightening the set screws 133'. The instrument is then used in taking the measurement in the same manner as the manipulation of the first described form of the invention. If it is desired to measure the depth of an annular recess of a bore hole, the attachments 151 and 152 having the proper shaped lugs 156 and 157 are applied to the ends of the gauge blocks.

In the form of the invention illustrated in Figs. 14 to 16, inclusive, adjustment for compensation is to bring the pointer 192 on the zero point of the scale 193 for the zero reading of the calibrated scales on the collar and barrel members 68 and 99. Assuming that the outer arm 167 is inserted in a bore hole to be measured, the cap 100 is rotated to effect movement of the plunger 34 and a transverse movement of the member 159. This shifts the inner arm within the outer arm so that when the outer arm is in contact with the wall on one side of the bore hole, the projection 182 is brought into contact with the wall on the opposite side of the bore hole. A final adjustment is attained by manipulating the sleeve 111.

From the foregoing, it is obvious that I have provided a measuring instrument having a simple and effective means incorporated therein for coordinating movements of the working parts in accordance with the calibrations, and that the accuracy of the instrument can be maintained throughout its life by periodic checks, and, if compensation is necessary, it is readily effected simply by changing the angle or bias of the pin 41 which connects the longitudinal reciprocatory plunger with the transverse reciprocatory member or stem that carries the movable gauge element.

It is also obvious that the provision for interchangeable gauge blocks increases the range of measurements that can be attained with a single instrument. The gauge block attachments also adapt a single instrument to the measurement of different inner shapes, such as internal grooves, threads, and the like.

It is also obvious that instruments constructed in accordance with the present invention are adapted to give direct readings between opposite diametrical points of a bore hole, and that the particular form of the gauge blocks assures opposite diametrical contact when a diameter measurement is to be made.

It is also obvious that the moving parts are cylindrical, so that they rotate or move coaxially with respect to each other, thereby promoting accuracy without complicated machining operations.

What I claim and desire to secure by Letters Patent is:

1. A measuring instrument including a micrometer mechanism, a gauging mechanism, and means interconnecting said mechanisms for transmitting motion of the micrometer mechanism to the gauging mechanism, wherein said interconnecting means includes a longitudinal reciprocatory member connected with the micrometer mechanism, a transverse reciprocatory member connected with the gauging mechanism, an elongated motion transmitting member extending angularly of the directions of movement of the reciprocatory members, and means on each reciprocatory member and providing supports for respective ends of said motion transmitting member, one of said ends being fixed to one of said supporting means and the other end being reciprocably guided by the other supporting means in the angular direction to maintain said angular relationship during motion of the longitudinal reciprocatory member to transmit motion to the transverse reciprocatory member.

2. A measuring instrument including a micrometer mechanism, a gauging mechanism including fixed and movable gauge elements, a longitudinal reciprocatory member connected with the micrometer mechanism, a transverse reciprocatory member connected with the gauging mechanism and carrying the movable gauge element toward and from the fixed gauge element, an elongated motion transmitting member extending angularly of the directions of movement of the reciprocatory members, and means having adjustable mounting on each reciprocatory member for retaining ends of said motion transmitting member to maintain the angular relationship during motion of the longitudinal reciprocatory member, one of said ends being movable within the said retaining means therefor in the direction of elongation of said motion transmitting member to transmit motion to the transverse reciprocatory member for actuating the movable gauge element of the gauging mechanism.

3. A measuring instrument including a micrometer mechanism, a gauging mechanism, a longitudinal reciprocatory member connected with the micrometer mechanism, a transverse reciprocatory member connected with the gauging mechanism, a pin extending angularly of the directions of movement of the reciprocatory members, and a support on each reciprocatory member and having a bore containing a respective end of the pin to maintain the angular relationship of the pin during motion of the longitudinal reciprocatory member to transmit motion to the transverse reciprocatory member for actuating the gauging mechanism.

4. A measuring instrument including a micrometer mechanism, a longitudinal reciprocatory member connected with the micrometer mechanism, fixed and movable gauge members, a transverse reciprocatory member connected with and carrying the movable gauge member, a pin extending angularly of the directions of movement of the reciprocatory members, a support on each reciprocatory member and each having a bore containing a respective end of the pin to maintain the angular relationship of the pin during motion of the longitudinal reciprocatory member to transmit motion to the transverse reciprocatory member for actuating the gauge member, and means for adjustably anchoring the supports on the respective reciprocatory members to change the angle of said pin for adjusting the position of the movable gauge member relatively to the micrometer mechanism.

5. A measuring instrument including a micrometer mechanism, a gauging mechanism, a longitudinal reciprocatory member connected with the micrometer mechanism, a transverse reciprocatory member connected with the gauging mechanism, a connector extending angularly of the directions of movement of the reciprocatory members, means on each reciprocatory member and forming supports for said connector to maintain the angular relationship of the connector to transmit motion of the longitudinal reciprocatory member to the transverse reciprocatory member, one of said supporting means forming a sliding guide with the connector, means for anchoring the connector to the other of said supporting means, and means for mounting the said supporting means on the reciprocatory members for changing the angular relationship with respect to said reciprocatory members for adjusting the gauging mechanism with respect to the micrometer mechanism when desired.

6. A measuring instrument including a micrometer mechanism, a gauging mechanism, a longitudinal reciprocatory member connected with the micrometer mechanism, a transverse reciprocatory member connected with the gauging mechanism, a pin extending angularly of the directions of movement of the reciprocatory members, a support on each reciprocatory member having a diametrical bore to contain an end of said pin, means for adjustably mounting the supports on the reciprocatory members, and means for clamping the supports in adjusted position to maintain angular relationship of the pin to transmit motion of the longitudinal reciprocatory member to the transverse reciprocatory member.

7. A measuring instrument including a micrometer mechanism, a gauging mechanism, a longitudinal reciprocatory member connected with the micrometer mechanism, a transverse reciprocatory member connected with the gauging mechanism, a connector extending angularly of the directions of movement of the reciprocatory members, means on each reciprocatory member and forming supports for said connector to maintain the angular relationship of the connector to transmit motion of the longitudinal reciprocatory member to the transverse reciprocatory member, one of said supporting means having a bore for forming a sliding guide with an end of the connector, means for anchoring the other end of the connector to the other of said supporting means, and means for adjustably securing the supporting means to the respective reciprocatory members for changing the angular relationship of the connector with the reciprocatory members to adjust the gauging mechanism with respect to the micrometer mechanism.

8. A measuring instrument including a measuring head, a gauge block having support on one side of said head, a transverse member, means reciprocably supporting the transverse member for reciprocation in said head in alignment with the gauge block, a gauge block on the transverse member and movable therewith toward and from the first named gauge block, a micrometer mechanism, a reciprocatory member slidable longitudinally in said head on actuation of the micrometer mechanism, each of said reciprocatory members having a flat portion, pin supporting members having face contact with said flat portions, a pin supported in said members, means clamping the pin supporting members to said flat portions to retain the pin in bias relation with the reciprocatory members, said pin being slidable in one of said pin supports, and means anchoring the pin in the other supporting member to effect contact of the gauge blocks with opposite sides of a bore hole to be measured by said instrument.

9. A measuring instrument as described in claim 8 wherein at least one of the gauge blocks is removable for replacement by a gauge block of different size to increase the measuring capacity of the instrument with the same relative movement of the gauge blocks.

10. A measuring instrument including a measuring head, a pin projecting from one side of the measuring head, a gauge block having support on said pin, a transverse member having reciprocating support in said head, a pin extending laterally of said transverse member in parallel with the first named pin, a gauge block on the last named pin, a micrometer mechanism, a reciprocatory member slidable longitudinally in said head and connected with the micrometer mechanism, each of said reciprocatory members having a part carried thereon and each of said parts being provided with a transverse bore, a pin having ends engaging in said bores to connect said parts on said reciprocatory members, means anchoring the pin in one of said parts, said pin being slidable in the other of said parts during movement of the longitudinal reciprocatory member, and means for clamping said parts to the reciprocating members to retain the pin in angular relation with said members to effect movement of the transverse reciprocatory member to carry the gauge blocks into contact with opposite sides of a bore hole to be measured by said instrument upon actuation of the micrometer mechanism.

11. A measuring instrument including a micrometer mechanism, a measuring head connected with the micrometer mechanism, a longitudinal reciprocatory member slidable in said head and connected with the micrometer mechanism, a transverse reciprocatory member slidable in said head, a support on each reciprocatory member having a diametrical bore, a pin having ends contained in said bores, means for adjustably mounting the supports on the reciprocatory members, means for clamping the supports in adjusted position on said reciprocatory members to bias the pin with respect to the reciprocatory members for transmitting motion of the longitudinal reciprocatory member to the transverse reciprocatory member, a stationary gauge element on said head, and a gauge element carried by the transverse reciprocatory member.

12. A measuring instrument as described in claim 11 wherein the gauge elements comprise an outer tubular arm on said head, and an inner tubular arm of relatively smaller diameter projecting from the transverse member into the said outer tubular arm and having a part projecting through one side of the said outer tubular arm and cooperating with the opposite side of said outer tubular arm to provide contact points for said instrument.

13. A measuring instrument as described in claim 11 wherein the gauge elements comprise an outer tubular arm on said head, an inner tubular arm of relatively smaller diameter projecting from the transverse member into the said other tubular member and having a part pivoted thereon and cooperating with a side of said outer tubular arm to provide contact points for said instrument and wherein said instrument includes an indicator carried in said head and a rod engaged by the pivotal part to actuate the indicator to indicate a relative position of said contact points relatively to calibrations of said micrometer mechanism.

14. A measuring instrument including a measuring head, a micrometer mechanism connected with said measuring head, a reciprocatory member having reciprocable support transversely within said measuring head, a movable gauge block fixed to an end of the reciprocatory member at one side of the measuring head, a longitudinally reciprocatory member connected with the micrometer mechanism, an angularly disposed motion transmitting member having ends adapted for connection with the reciprocatory members, means on the reciprocatory members for supporting said ends of the angularly disposed motion transmitting member, one of said ends of the motion transmitting member being fixed to its supporting means and the other being slidable in its supporting means to effect movement of the transverse reciprocatory member upon reciprocation of the longitudinal reciprocatory member, means for adjustably fixing the said supporting means of the motion transmitting member on the reciprocating members to change the angle of the motion transmitting member, a stationary gauge block on the head opposite the movable gauge block, and means for removably supporting the fixed gauge block on the measuring head for replacement by a gauge block of different thickness to increase the range of measurements attainable within the range of movement of the movable gauge block by said motion transmitting means.

15. In a measuring instrument, a tubular shank having a head at an end thereof, a longitudinal member reciprocable longitudinally in the tubular shank, a gauge member having sliding support in the head transversely of the longitudinal member, a pin on a bias with respect to said members and having one end fixed to one member and having the other end slidably connected with the longitudinal member and angularly movable with respect thereto, and means for reciprocating the longitudinal member in said tubular shank for causing the pin to reciprocate the gauge member for adjusting the gauge member in said head.

16. In a measuring instrument, a tubular shank having a head on an end thereof, a longitudinal member reciprocable longitudinally in the tubular shank, a gauge member having sliding support in the head transversely of the longitudinal member, said members having parts provided with bores extending angularly of the directions of movement of said members, a pin on a bias with respect to said members for interconnecting said members and having one end fixed in the angular bore of the part of the gauge member and having the other end slidable in the bore of the part of the longitudinal member, and means for reciprocating the longitudinal member in said tubular shank for causing the pin to reciprocate the gauge member for adjusting the gauge member in said head.

References Cited in the file of this patent

UNITED STATES PATENTS

| 846,607 | Peddycoart | Mar. 12, 1907 |
| 1,417,001 | Volis | May 23, 1922 |
| 1,451,736 | Lauer | Apr. 17, 1923 |
| 2,135,912 | Rae | Nov. 8, 1938 |
| 2,663,942 | Rudolph | Dec. 29, 1953 |

FOREIGN PATENTS

| 49,000 | Sweden | Apr. 20, 1921 |